United States Patent
Parus et al.

(10) Patent No.: US 6,868,384 B2
(45) Date of Patent: Mar. 15, 2005

(54) METHOD FOR ADVERTISING IN SPEECH-SUPPORTED TELECOMMUNICATION LINKS

(75) Inventors: Hardy Parus, Venusstrasse (DE); Romeo Peter Wetzel, Rotenwaldstrasse (DE)

(73) Assignees: Deutsche Telekom AG, Bonn (DE); Infoman AG, Stuttgart (DE)

(*) Notice: Subject to any disclaimer, the term of this patent is extended or adjusted under 35 U.S.C. 154(b) by 579 days.

(21) Appl. No.: 09/789,107

(22) Filed: Feb. 20, 2001

(65) Prior Publication Data

US 2001/0054000 A1 Dec. 20, 2001

(30) Foreign Application Priority Data

Feb. 18, 2000 (DE) .......................... 100 08 782

(51) Int. Cl.[7] .............................. G10L 15/00
(52) U.S. Cl. ................... 704/270; 379/88.12; 705/14
(58) Field of Search ............ 379/88.18, 88.22; 705/14, 27; 704/270, 275

(56) References Cited

U.S. PATENT DOCUMENTS

| | | | | |
|---|---|---|---|---|
| 5,745,882 A | * | 4/1998 | Bixler et al. ............... | 705/26 |
| 5,937,390 A | * | 8/1999 | Hyodo ....................... | 705/14 |
| 6,084,628 A | * | 7/2000 | Sawyer ....................... | 725/34 |
| 6,683,941 B2 | * | 1/2004 | Brown et al. ............ | 379/88.22 |

* cited by examiner

Primary Examiner—Daniel Abebe
(74) Attorney, Agent, or Firm—Kenyon & Kenyon

(57) ABSTRACT

The method provides importing advertising information into a telephone connection and providing an advertising dialogue system configured to assist in importing the advertising information into the telephone connection and to manage the advertising information and an advertising action which are looped into the telephone connection. The method further provides assigning at least one action indicator and a start action instruction to the advertising information. The at least one action indicator is configured to indicate the advertising action possible with the advertising information. The start action instruction is configured to start the advertising action, the start action instruction being triggerable by a user and activating the advertising action associated with the advertising information managed by the advertising dialogue system. The advertising dialogue system provides any service associated with the advertising action as automatically available to the user.

2 Claims, 1 Drawing Sheet

METHOD FOR ADVERTISING IN SPEECH-SUPPORTED TELECOMMUNICATION LINKS

FIELD OF THE INVENTION

The present invention relates to advertising in speech-supported communication links, particularly during a telephone conversation.

BACKGROUND INFORMATION

To be able to offer telecommunications services at zero tariff, the feasibility and associated acceptance of commercial spots in telephone calls was examined in a test (see Telefongesellschaft Otelo under http://www.userpage.fuberlin.de/·dittbern/Telekom/Old_News5.html). For example, the Berlin Phone Company TeleFlash planned to interrupt conversations every 90 seconds in order to insert a 20 second long commercial. However, in exchange, the conversations were to be free of charge. (See Golem Network News of Jan. 18, 1999 http://www.ggn.de/9901/9901 1803-ji.html). For these approaches, contact information is specified in the advertisement which the customer must note if he/she is interested. After ending his conversation, the customer can contact the advertising partner in question via this contact address.

SUMMARY OF THE INVENTION

The present invention provides a customer with a possibility of reacting for a brief time to an advertising offer inserted into an existing telephone connection.

In an embodiment of the present invention, during a call existing between a customer A and a conversation partner B, advertising information can be selectively inserted into the call by an automatic advertising dialogue system C looped into the telephone connection.

In this context, the individual pieces of advertising information can be developed in such a way that they offer customer A the possibility of reacting immediately to the inserted advertising offers. The advertisements and the possible actions with respect to the advertisements can be managed in automatic advertising dialogue system C.

According to another embodiment of the present invention, activation possibilities can be pointed out to the customer in the advertisement inserted into the conversation, with which, in interaction with advertising dialogue system C, the customer can react immediately to an advertisement.

In other embodiments of the present invention, the customer can interact with advertising dialogue system C via speech input or via button actuation.

In such embodiments of the present invention, by speech input of a keyword or by button actuation, the customer can trigger the following actions of advertising dialogue system C: establishment of a telephone connection to a contact address of the advertising party; insertion of additional information with respect to advertisements, such as continuing texts for the advertisement in question; connection to a telephone value-added service; acquisition of call-back information; and context-related interactions in the dialogue with the customer.

In embodiments of the present invention, there are at least two ways in which the advertising information by advertising dialogue system C can be inserted into the telephone communication between customer A and conversation partner B. One such way of the present invention involves inserting advertising information into a conversation at defined time intervals, irrespective of the course of conversation. In this variant, the individual pieces of advertising information are inserted automatically by advertising dialogue system C into the telephone communication on the basis of a time control.

Another embodiment of the present invention involves selective, conversation-oriented insertion of advertising information. In this embodiment, a control connection can exist between subscriber B and advertising dialogue system C. In this case, the instant for inserting advertisements is controlled by conversation partner B. This embodiment can make it possible to selectively insert advertising information into the existing telephone conversation at suitable points.

Another embodiment of the present invention provides a method for advertising in speech-supported telecommunication links, in which advertising information is inserted during a telephone connection. Advertising information is imported into an existing telephone connection by an advertising dialogue system which manages advertising information and actions with respect to advertising information and which is looped into the existing telephone connection. Each piece of advertising information is assigned at least one indication regarding an action that is possible in connection with the advertising information and a start instruction for this action. By triggering the start instruction, the customer activates the action(s) stored in the advertising dialogue system regarding the piece of advertising information in question. The service(s) associated with the action(s) is/are automatically made available to the customer by the advertising dialogue system.

Additionally, a further embodiment of the present invention involves providing that the information about a keyword or a key sentence with respect to the imported advertising information is output to the customer by the advertising dialogue system as a start instruction for the action offered within the framework of the advertising information, and that after the customer has activated the keyword or the key sentence, the action in question is carried out for the customer by the advertising dialogue system.

Another embodiment further provides that, with respect to the imported advertising information, information is output to a customer about a button or a button combination of the telephone as a start instruction for the action offered within the framework of the advertising information, and that after the customer has actuated the button/button combination, the action in question is carried out for the customer by the advertising dialogue system.

Another embodiment of the present invention further provides that the individual pieces of advertising information are inserted into the subject telephone connection by the advertising dialogue system in a time-controlled manner at previously established, regular intervals.

Another embodiment of the present invention further provides that the insertion of a piece of advertising information is controlled by a conversation partner, a signal being generated by a conversation partner and transmitted to the advertising dialogue system via a data connection switched between the conversation partner and the advertising dialogue system; that the transmitted signal triggers the advertising dialogue system to insert a piece of advertising information into the existing telephone connection; and that after the advertising information has ended, a counter-signal which signals to conversation partner the end of the advertising information is generated by the advertising dialogue system and transmitted to the conversation partner via the data connection.

Another embodiment of the present invention further provides that the insertion of a piece of advertising information is controlled by a conversation partner, a signal being generated by a conversation partner and inserted into the existing telephone connection; that the signal inserted into the telephone connection is detected by the advertising dialogue system and triggers the insertion of a piece of advertising information into the existing telephone connection; and that after the advertising information has ended, a counter-signal which signals to a conversation partner the end of the advertising information is generated by the advertising dialogue system and inserted into the existing telephone connection.

Another embodiment of the present invention further provides that additional information about the subscriber/customer and/or information about the conversation context is transmitted by a conversation partner to the advertising dialogue system.

Another embodiment of the present invention further provides that the additionally transmitted information about the subscriber/customer and about the conversation context is used in the advertising dialogue system for selecting advertising information specific to the targeted audience to be inserted into the conversation.

These embodiments of the present invention disclosed herein can be used in a variety of combinations with each other.

DETAILED DESCRIPTION

Figure 1:
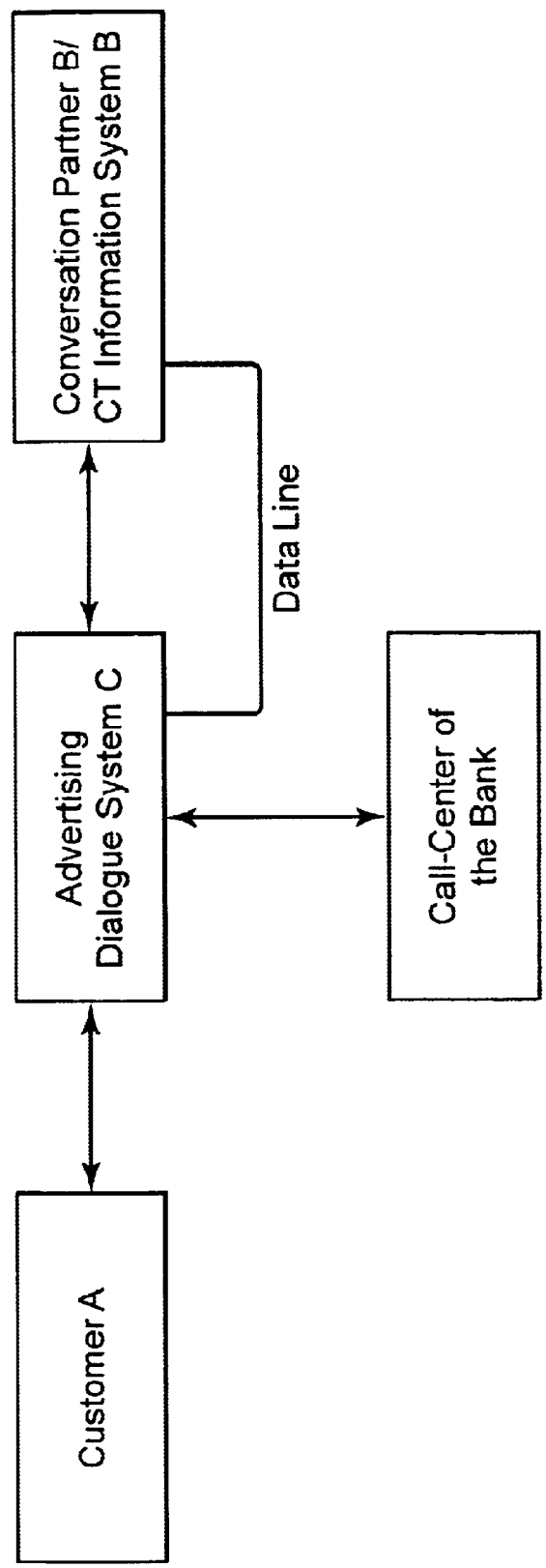
FIG. 1 shows a flow schematic of an embodiment of the method of the present invention.

In the exemplary embodiment according to FIG. 1, conversation partner B is a computer-telephony information system (CT-Information System B), which, as a provision of services, offers access to information data banks for automobiles. In response to an inquiry from customer A, e.g., for technical information concerning a specific vehicle type, CT-Information System B can ascertain the desired information via the information data banks allocated to it and outputs it in the form of voice information to customer A by way of the existing telephone connection. This voice information can be automatically interrupted by CT-Information System B at a suitable point. At the same time, advertising dialogue system C, which is looped into the conversation, can be activated by CT-Information System B and induced to insert a piece of advertising information into the conversation.

In the embodiment of the present invention according to FIG. 1, the activation is effected via a data line between CT-Information System B and advertising dialogue system C. For the control via a data line, a signal is generated by conversation partner B and transmitted to interactive voice-communication system C via the data line switched between conversation partner B and advertising dialogue system C. The transmitted signal triggers advertising dialogue system C to insert a piece of advertising information into the existing telephone communication. After the advertising information has terminated, a counter-signal is generated in advertising dialogue system C and transmitted via the data line to conversation partner B. The counter-signal indicates to conversation partner B the end of the advertising information. The original conversation between customer A and CT-Information System B can be continued.

It is also possible for the insertion of advertising information to be controlled by conversation partner B via the telephone connection existing to customer A. In this design approach, CT-Information System B generates and outputs a signal. The signal is detected by advertising dialogue system C and causes it to insert a piece of advertising information into the existing telephone communication. After the advertising information has terminated, advertising dialogue system C generates and outputs a counter-signal. The counter-signal is detected by CT-Information System B and indicates to it the end of the advertising information. The original conversation between customer A and CT-Information System B can thereupon be continued.

In this connection, information about subscriber A and/or information about the conversation context between CT-Information System B and subscriber A can be acquired by CT-Information System B and likewise transmitted to advertising dialogue system C. This additional information is used in advertising dialogue system C for selecting advertising information specific to the target group to be inserted into the conversation. This is done with the aid of an evaluating logic disposed in advertising dialogue system C.

Since the information called up by customer A may be information concerning a model of motor vehicle; it is possible, for example, to insert advertising information relating to this particular motor-vehicle model. For instance, the advertising information can be designed as a financing offer from a bank for a new car. Each piece of advertising information contains at least one keyword and/or information about a button of the telecommunications terminal of customer A to be actuated. Using the keyword or the button actuation, customer A can react to the advertisement, since actions which are connected to the advertising information in question are allocated to the keyword or the button actuation. If, during or after a piece of advertising information, customer A inputs the keyword, transmitted with the advertising information, as a voice signal, then the input keyword is compared to the keywords stored in advertising dialogue system C concerning the individual advertising offers. If there is agreement with a stored keyword, advertising dialogue system C can automatically start the action(s) stored with respect to the keyword in question.

In another embodiment of the present invention, the action is for advertising dialogue system C to automatically establish for the customer a connection to a Call Center of the bank in whose financing offer customer A is interested. After the connection to the Call Center of the bank has been established, customer A can inquire about a service wish and, in the event of interest, can even accept a financing offer. After the conversation with the Call Center of the bank has ended, customer A can continue the conversation with CT-Information System B and query further information, or terminate the conversation.

Embodiments of the present invention can be of particular interest to service providers who, as a service, offer a data-supported information system having information concerning products. The present invention makes it possible to selectively underlay product information with product-accompanying advertising information for the customer. The customer is thereby able to react immediately and without great expenditure of time and energy to advertising information regarding facts which are of interest to the customer.

In any embodiments of the present invention, the service providers operating the information service can use the method of the present invention for refinancing their services via advertising revenue. In any embodiments of the present invention, the advertising firm can use the method of the present invention for individual advertising oriented toward a targeted audience.

Due to a logical separation between CT-Information System B and advertising dialogue system C, customers, in particular the operators of telecommunications networks, can operate the method of the present invention centrally themselves and can further offer the method of the present invention as a service for use to suitable network subscribers such as information services, value-added services and those carrying on advertising.

What is claimed is:

1. A method for advertising in speech-supported telecommunication links comprising:

importing advertising information into a telephone connection involving a telephone;

providing an advertising dialogue system configured to assist in importing the advertising information into the telephone connection and to manage the advertising information and an advertising action which are imported into the telephone connection;

assigning at least one action indicator and a start action instruction to the advertising information, the at least one action indicator configured to indicate the advertising action possible with the advertising information, the start action instruction configured to start the advertising action, the start action instruction being triggerable by a user and being configured to activate the advertising action associated with the advertising information managed by the advertising dialogue system, the advertising dialogue system providing any service associated with the advertising action as available automatically to the user, wherein the advertising information includes an at least one individual segment of information; and inserting the at least one individual segment into the telephone connection by the advertising dialogue system at a rate controlled by a conversation partner, the rate controlled by the conversation partner including: generating a signal by the conversation partner and transmitting the signal to the advertising dialogue system using a data connection between the conversation partner and the advertising dialogue system, the transmitted signal triggering the advertising dialogue system to insert the at least one of the individual segments of information into the telephone connection, and transmitting a counter-signal to the conversation partner by the advertising dialogue system using the data connection when the at least one individual segments have been transmitted, the counter-signal indicating that the advertising information has ended.

2. A method for advertising in speech-supported telecommunication links comprising:

importing advertising information into a telephone connection involving a telephone;

providing an advertising dialogue system configured to assist in importing the advertising information into the telephone connection and to manage the advertising information and an advertising action which are imported into the telephone connection;

assigning at least one action indicator and a start action instruction to the advertising information, the at least one action indicator configured to indicate the advertising action possible with the advertising information, the start action instruction configured to start the advertising action, the start action instruction being triggerable by a user and being configured to activate the advertising action associated with the advertising information managed by the advertising dialogue system, the advertising dialogue system providing any service associated with the advertising action as available automatically to the user; and inserting the at least one individual segment into the telephone connection by the advertising dialogue system at a rate controlled by a conversation partner, the rate controlled by the conversation partner including: generating a signal by the conversation partner and inserting the signal into the telephone connection, detecting the signal inserted into the telephone connection using the advertising dialogue system, the signal triggering the insertion of the at least one segment of information into the telephone connection, and generating a counter-signal by the advertising dialogue system when the insertion of the at least one segment of information has ended, and inserting the counter-signal into the telephone conversation, the counter-signal indicating to the conversation partner that the at least one segment of information has ended.

* * * * *